United States Patent
Pickenhahn et al.

Patent Number: 5,244,259
Date of Patent: Sep. 14, 1993

[54] METHOD OF ANTI-LOCK BRAKING OF A MOTORCYCLE AND OF DETERMINING THE COEFFICIENT OF ADHESION

[75] Inventors: Josef Pickenhahn, Plaidt; Alois Weidele, Essingen; Martin Fischer, Wolfsburg, all of Fed. Rep. of Germany

[73] Assignee: Lucas Industries public limited company, Birmingham, England

[21] Appl. No.: 752,448

[22] PCT Filed: Dec. 28, 1990

[86] PCT No.: PCT/EP90/02330
§ 371 Date: Sep. 5, 1991
§ 102(e) Date: Sep. 5, 1991

[87] PCT Pub. No.: WO91/09759
PCT Pub. Date: Jul. 11, 1991

[30] Foreign Application Priority Data
Jan. 5, 1990 [DE] Fed. Rep. of Germany ....... 4000212

[51] Int. Cl.$^5$ ............................................... B60T 8/68
[52] U.S. Cl. ........................................ 303/111; 303/108
[58] Field of Search ................ 303/9.64, 103, 106, 303/108, 111, 113 AP, 109, 120; 364/426.01–426.03

[56] References Cited

U.S. PATENT DOCUMENTS

| | | | |
|---|---|---|---|
| 4,494,800 | 1/1985 | Hayashi | 303/9.64 |
| 4,554,990 | 11/1985 | Kamiya et al. | 303/106 X |
| 4,626,042 | 12/1986 | Burckhardt | 303/96 X |
| 4,852,951 | 8/1989 | Matsuda | 303/108 X |
| 4,916,619 | 4/1990 | Walenty et al. | 303/106 X |
| 4,989,922 | 2/1991 | Pickenhahn et al. | 303/100 |

FOREIGN PATENT DOCUMENTS

| | | | |
|---|---|---|---|
| 370469 | 11/1989 | European Pat. Off. | |
| 398360 | 11/1990 | European Pat. Off. | |
| 3530280 | 2/1987 | Fed. Rep. of Germany | |
| 275254 | 11/1989 | Japan | 303/108 |
| 8807466 | 10/1988 | World Int. Prop. O. | 303/108 |

Primary Examiner—Robert J. Oberleitner
Assistant Examiner—Alfred Muratori
Attorney, Agent, or Firm—Oblon, Spivak, McClelland, Maier & Neustadt

[57] ABSTRACT

A method of determining the coefficient of adhesion between a roadway and the wheels of a motorcycle provides for retarding the rear wheel of the motorcycle more strongly than the front wheel for a predetermined period of time and for comparing the rotational speeds or the rotational retardations of the front and rear wheels. Furthermore, the sloping of the motorcycle is measured directly so as to determine both the longitudinal coefficient of adhesion and the lateral coefficient of adhesion from the sloping. The coefficients of adhesion thus obtained serve for adjustment of threshold values for anti-lock braking of the motorcycle.

4 Claims, 3 Drawing Sheets

METHOD OF ANTI-LOCK BRAKING OF A MOTORCYCLE AND OF DETERMINING THE COEFFICIENT OF ADHESION

BACKGROUND OF THE INVENTION

The invention relates to a method of anti-lock braking of a motorcycle, wherein the brake pressure in the brake of a front wheel or rear wheel is kept constant or reduced when the rotational retardation and/or slip of the wheel exceed a predetermined threshold value.

The invention further relates to a method of determining the coefficient of adhesion between a roadway and the wheels of a motorcycle, especially the determination of the longitudinal and lateral coefficients of adhesion.

DESCRIPTION OF PRIOR ART

Different varieties of anti-lock brake systems for motorcycles are known as such. With them, anti-lock brake systems (ABS) known for four-wheel vehicles are modified in consideration of the special characteristics of a single-track, two-wheel vehicle.

Methods are known, with four-wheel vehicles, of obtaining a statement on the instantaneous coefficient of adhesion between a wheel and the roadway by retarding that wheel more than another wheel for a brief moment so as to derive a statement on the coefficient of adhesion from the slip of the more strongly retarded wheel. In this case it is assumed that the driving stability of the four-wheel vehicle will not be impaired by such a short-term disturbance. With a two-wheel vehicle, on the other hand, that method would appear to be unsuited as both wheels necessarily have to remain stable.

SUMMARY OF THE INVENTION

The invention has for its aim to improve a conventional ABS braking system for a motorcycle, at little expenditure, such that information can be obtained about the coefficient of adhesion between the wheels and the roadway, on the one hand, and, on the other hand, the anti-lock control is adjusted in accordance with the coefficient of adhesion determined.

According to a first embodiment of the invention first it is determined if the motorcycle is in an inclined position, e.g. driving through a curve and, depending on the measured value of that sloping, either a threshold value of response for anti-lock control and/or a gradient of pressure rise for anti-lock control corresponding to the value measured of the sloping is set, this being done according to limited grading. Apart from the sloping of the motorcycle, also the transverse acceleration thereof may be determined by per se known means in order to adjust the anti-lock control. Adjustment in respect of the sloping and/or the transverse acceleration may be realized in predetermined stages, especially three different stages. The response threshold values and/or the pressure increase gradients relating to the anti-lock control may be varied in three steps, depending on the degree of inclination or the amount of transverse acceleration. And the response threshold values or the pressure increase gradients of the ABS control are set more sensitively with increasing sloping or transverse acceleration so that the retarded wheel can be caused to suffer a lower maximum slip upon braking as the inclination or transverse acceleration becomes greater.

In accordance with the invention provision is made for determining the coefficient of adhesion between the roadway and the wheels of the motorcycle by retarding the rear wheel of the motorcycle more than the front wheel, for a given time span, and comparing the rotational speeds and/or the rotational retardations of the front and rear wheels so as to derive the coefficient of adhesion from the result of the comparison.

The invention is based on the finding that, for a short period of time, a motorcycle quite well may be retarded more strongly at the rear wheel than at the front wheel without causing any considerable risk to the driving stability, even when driving through a curve. That is distinctly in contrast to the dynamics of four-wheel vehicles where overbraking of the rear wheels may generate a torque about the vertical axis, thus resulting in complete instability.

For braking during straightforward movement (without any sloping worth mentioning of the motorcycle) the slip between the rear wheel which is retarded somewhat more in the above manner and the front wheel is an unambiguous function of the coefficient of adhesion of that given motorcycle which is equipped with the prescribed tires and a given loading (weight of the driver, passenger, baggage). This function with a given loading can be memorized as a parameter in a computer (e.g. in the form of a table). The experimental data may be obtained from test runs on an experimental course with different known coefficients of adhesion (measured in another known manner) and stored once and for all in the computer. The instantaneous loading of the motorcycle may be determined by a simple force measurement and entered into the computer, e.g. during slow forward driving. The computer thus will "know" the loading of the motorcycle and be able, upon braking, to determine the coefficient of adhesion directly from the slip of the rear wheel which is retarded more than the front wheel in defined manner, based on the data memorized. In accordance with a preferred embodiment of the invention that is accomplished by the fact that in principle less pressure is fed into the brakes of the front axle than into the brakes of the rear axle by way of a mechanical pressure hold-back valve. The coefficient of adhesion thus determined either may be indicated to the driver or drawn upon directly for modification of the anti-lock control. The lower the coefficient of adhesion (coefficient of friction), the more sensitive the adjustment of the ABS control must be, i.e. the threshold values of the anti-lock control causing initiation of a reduction in pressure or maintenance of a constant level of the pressure at the brake must be set more sensitively. The determination of the coefficient of adhesion between the tire and the roadway in accordance with the invention permits better anti-lock control due to the fact that, in accordance with the values of ahesion measured, the ABS pressure increase gradients and/or the threshold values can be set in response to the values of adhesion.

In accordance with another preferred embodiment of the invention, therefore, only very low brake pressure (pressure just sufficient to cause engagement of the brakes) is supplied to the front axle brakes of the motorcycle in the so-called initial braking cycle (i.e. the first cycle of an anti-lock control operation), while the brakes of the rear axle are fed with relatively high brake pressure. In this manner information about the coefficient of adhesion between tire and roadway can be obtained right at the beginning of an anti-lock brake control operation, and subsequently the ABS control may be set for all the successive control cycles in accordance with the coefficient of friction measured. Specifically, an accurately tuned brake pressure may now be applied to the brake at the front axle, based on the coefficient of friction measured.

Of special interest in braking a motorcycle are the so-called longitudinal and lateral coefficients of adhesion, in other words the coefficients of friction, once in forward direction and, on the other hand, perpendicular to the same. These two coefficients of friction are decisive for the driving behavior of the motorcycle in inclined position, i.e. especially in a curve.

The invention provides a method of determining the instantaneous coefficients of adhesion between the wheels of a motorcycle and the roadway when driving through a curve. To achieve that, at least the following magnitudes are measured during a braking operation:
a) the wheel loads perpendicular and parallel to the roadway,
b) the brake torque, and
c) the wheel acceleration, and, if desired,
d) the sloping.

The longitudinal and lateral coefficients of adhesion are derived from the same.

The wheel loads vertically with respect to the roadway and parallel with respect to the roadway ($F_N$ and $F_S$, respectively) are calculated according to the invention by means of forces which are measurable directly at the motorcycle and the sloping angle.

The brake torque $M_B$ for any given brake system results directly from the measurable brake pressure, assuming a typical coefficient of friction of the brake and a mean temperature. In accordance with a refinement of the invention the temperature of the friction linings may be measured and the brake torque determined according to the temperature. Once again, the brake torques belonging to the brake are filed for good in the ABS computer in response to the brake pressure, if desired in dependence upon the temperature measured of the brakes, and they are available in the computer later on for evaluation.

The rotational speeds and rotational retardations of the wheels are determined or calculated in conventional manner by means of the ABS computer.

BRIEF DESCRIPTION OF THE DRAWINGS

An embodiment of the invention will be explained further with reference to the drawing, in which:

FIG. 2a is a transmitted signal intensity-time diagram for measuring slope of a motorcycle when it is level;

FIG. 2b is an intensity-time diagram when a motorcycle is sloping in a direction wherein a receiver $R_1$ at one end of the motorcycle handle bar is distal relative to a road surface;

FIG. 2c is a diameter similar to FIG. 2b when a second receiver $R_2$ at the opposite end of the handle bar is proximal to the road surface.

DESCRIPTION OF THE PREFERRED EMBODIMENT

In literature the coefficient of adhesion $\mu$ to be determined according to the invention is referred to also as coefficient of friction or coefficient of brake pressure, cf. for instance BOSCH TECHNISCHE BERICHTE, vol. 7, 1980, no. 2 (English special edition, February 1982, ISSN 0006-789X).

When a motorcycle is driving through a curve, i.e. when it is sloping it makes sense, for ABS braking, to look at a coefficient of adhesion $\mu_L$ in longitudinal direction (driving direction, i.e. tangent to the curve) and a coefficient of adhesion $\mu_S$ in lateral direction (in other words vertically as regards the longitudinal direction, i.e. radially with respect to the curve).

Due to Newton's axiom "rotational force=moment of inertia x rotational acceleration" the following differential equation results for the longitudinal coefficient of adhesion $\mu_L$ on the basis of physical considerations (cf. the above mentioned BOSCH TECHNISCHE BERICHTE):

$$\mu_L = \frac{\theta \times \dot{\omega} + M_B}{F_N \times R_R}$$

The lateral coefficient of adhesion $\mu_S$ results by definition from:

$$\mu_S = \frac{F_S}{F_N}$$

In the above equations:
$\mu_L$ = coefficient of adhesion (coefficient of friction) in longitudinal direction;
$\mu_S$ = coefficient of adhesion in transverse direction;
$\theta$ = rotational moment of inertia of the wheel (including vehicle parts which are kinematically coupled to the wheel, depending on coupling condition);
$\dot{\omega}$ = wheel acceleration;
$M_B$ = brake torque acting at the wheel;
$F_S$ = wheel load parallel to the roadway (see FIG. 1);
$F_N$ = wheel load perpendicular to the roadway (see FIG. 1);
$R_R$ = wheel radius.

In the above equation of $\mu_L$ both $\theta$ and $R_R$ can be regarded as being constant for a given motorcycle and, therefore, can be firmly set from the beginning. The brake torque $M_B$ is measurable, namely by measuring the brake pressure which prevails in the brake and to which the brake torque corresponds in first approximation when second approximations, such as the temperature of the brake, the state of the friction linings are neglected. If desired, the temperature of the brake may be measured and its influence on the brake torque on the basis of experimental data likewise be memorized in the computer so as to determine the associated brake torque in the computer on the basis of the prevailing brake pressure and temperature.

The wheel acceleration $\omega$ can be determined by means of rotational speed sensors in a manner known in the ABS art.

The wheel loads $F_N$ and $F_S$ can be determined by measuring forces acting at the motorcycle and by measuring the sloping $\lambda$ of the motorcycle. This is explained in FIGS. 1 and 2a.

Figure 1:
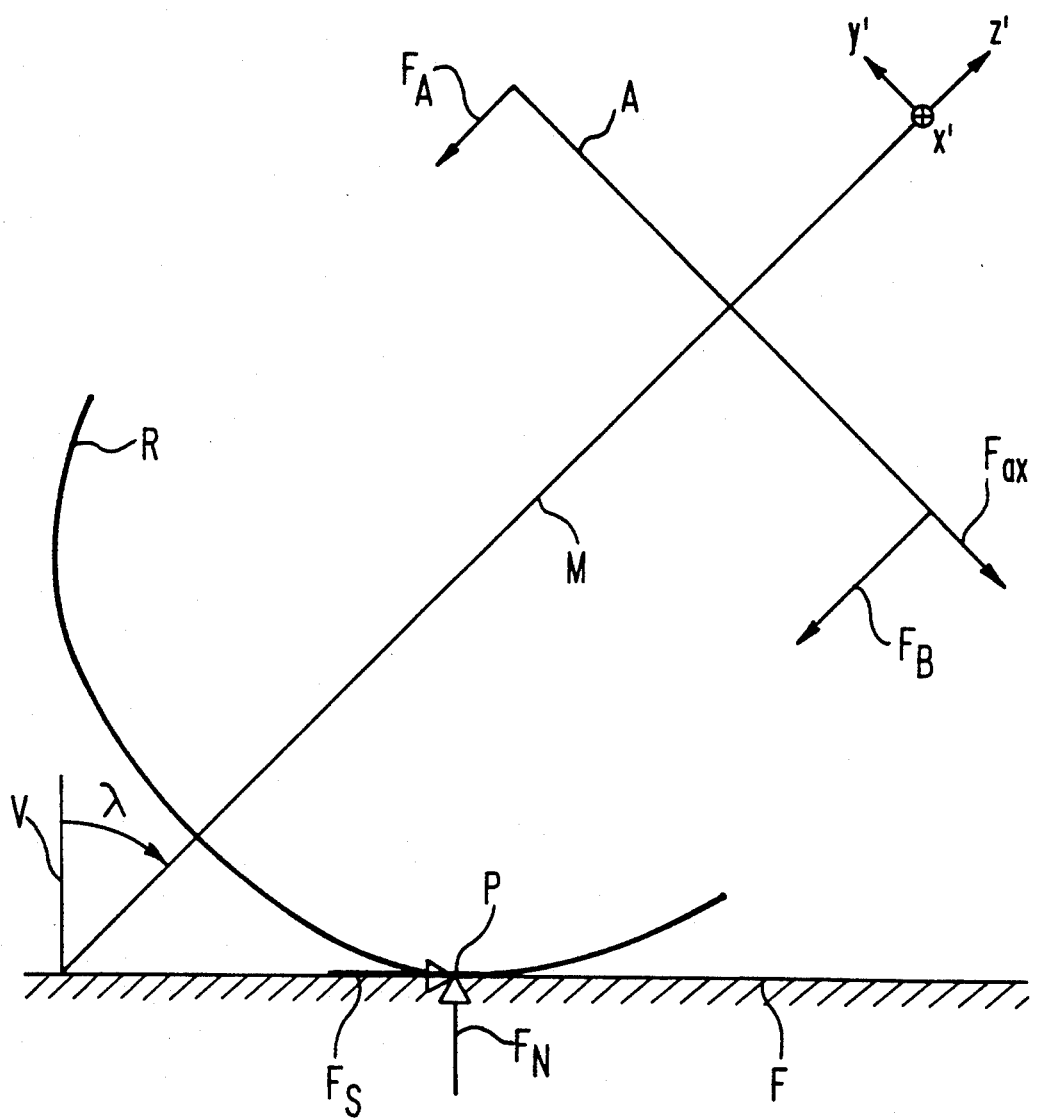
FIG. 1 is a diagrammatic presentation of a motorcycle in inclined position, of its center line, and of force vectors and angles essential to the invention.

FIG. 1 diagrammatically shows a tire R of a motorcycle on a roadway F, having a center line marked M. The motorcycle is in inclined position, its sloping angle λ being indicated with respect to the vertical V in FIGS. 1 and 2a. Due to the sloping, the point of contact P between the tire R and the roadway F travels away from the line of symmetry (center line M), taking an asymmetric position, as shown in FIG. 1.

Figure 2A:
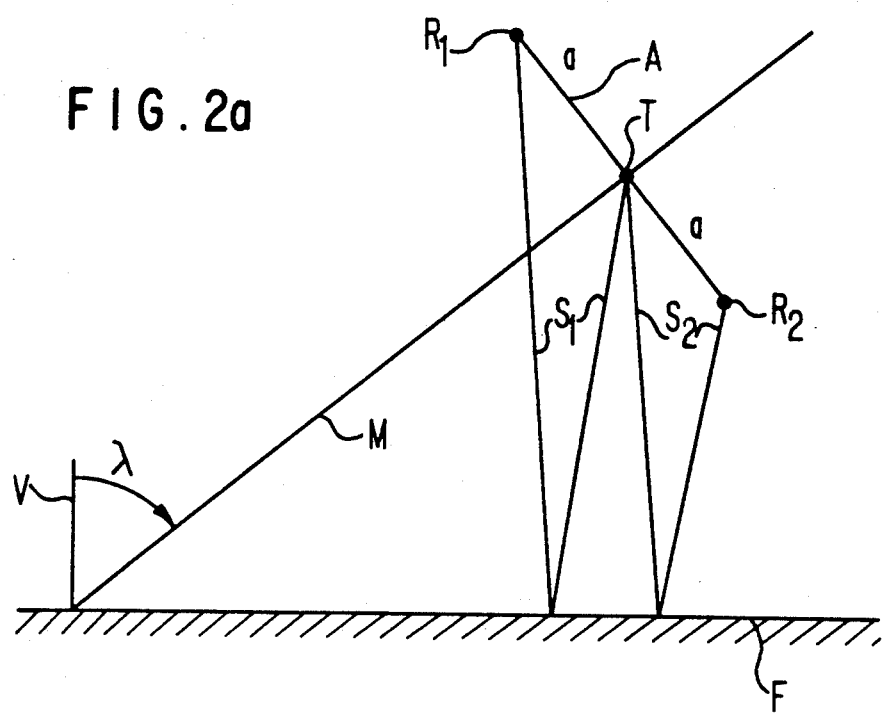
FIGS. 2a-2d are diagrammatic illustrations of the measurement of the sloping of the motorcycle.

$F_A$ and $F_B$ are the forces acting at the left and right forks, respectively, on the wheel axle A (FIGS. 1 and 2a). These forces $F_A$ and $F_B$ can be determined by known force measuring devices, such as strain gauge means etc. The situation is analogous with respect to the force component $F_{ax}$ which is vertical to the center line M, in other words the force acting on the wheel axle A perpendicular to the center line M. This force acts between the fork and the axle.

Thus the force vectors $F_A$, $F_B$, and $F_{ax}$ can be determined as to magnitude.

The determination of the sloping angle λ likewise is required to find out the wheel loads $F_N$ and $F_S$. The arrangement shown in FIG. 2a serves that purpose, with parts corresponding to FIG. 1 being marked by the same reference character. A transmitter T for ultrasonic waves is arranged centrally in the area of the wheel axle A to determine the inclined position. Receivers $R_1$ and $R_2$ spaced at distance a from the transmitter T are disposed at either side of the center line M of the motorcycle. Ultrasonic waves emitted by the transmitter T are reflected by the roadway F and received by the receivers $R_1$, $R_2$. The beams coming from the transmitter T and received by the receiver $R_1$ are marked $S_1$ in FIG. 2a, while the beams $S_2$ are reflected from the transmitter T to the receiver $R_2$.

The ultrasonic beams $S_1$ and $S_2$ are emitted in pulsating fashion, and the travelling times of the ultrasound to the individual receivers are measured. That is illustrated schematically in FIGS. 2b, 2c and 2d.

Figure 2B:
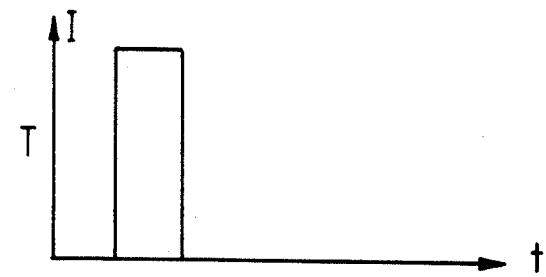
Figure 2C:
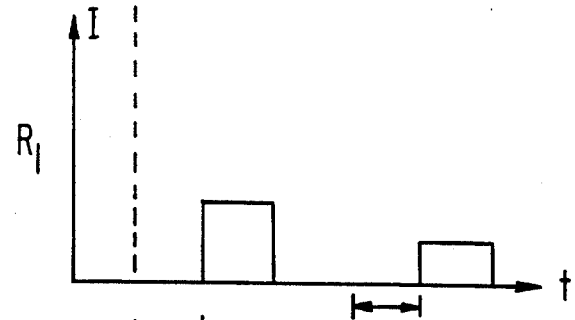
Figure 2D:
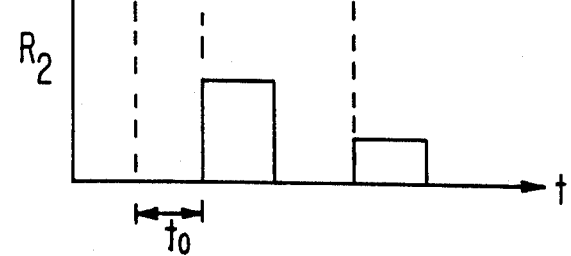

The intensities I of the signals are plotted above a common time scale t in FIGS. 2b, 2c and 2d.

FIG. 2b shows the intensity of the signal pulse emitted by the transmitter T. If the motorcycle is not sloping, i.e. if the angle λ is 0°, both receivers $R_1$ and $R_2$ will receive the signal after the same time $t_0$. The corresponding pulses are drawn in FIGS. 2c and 2d. When the motorcycle is at an inclination of sloping angle λ, receiver $R_1$ will receive the signal offset by a period of time t due to the greater distance.

The instantaneous velocity of sound c for the associated atmospheric moisture prevailing at the particular moment can be determined by means of time period $t_0$ since the travelilng distance results directly from the geometric conditions. The sloping angle λ is a function of the difference in time ◊ t. This function may be filed in the computer, either analytically as a function or as a truth table. Thus all the determining magnitudes are given for finding out the wheel loads $F_N$ and $F_S$. Geometric considerations result in the following equations for the wheel loads:

$$F_S = F_A \sin λ + F_B \sin λ - F_{ax} \cos λ$$

$$F_N = F_A \cos λ + F_B \cos λ + F_{ax} \sin λ$$

The computer thus determines the wheel loads $F_S$ and $F_N$ and directly from them the lateral coefficient of adhesion $μ_S = F_S/F_N$, starting from the measured data.

Furthermore the computer determines the longitudinal coefficient of adhesion $μ_L$ from the differential equation given above of which all the determinants likewise are known.

The determination described above of the coefficient of adhesion is a first embodiment of the invention. It may be realized selectively with the front wheel and, preferably, also with the rear wheel or with both wheels.

Conventional motorcycle ABS control can be improved with the aid of the longitudinal and/or lateral coefficients of adhesion thus determined in that the threshold values for initiating a reduction in pressure or for maintaining the pressure constant are adjusted according to the coefficients of adhesion measured. The lower the coefficients of adhesion are, the more sensitive the threshold values must be set. The lateral coefficient of adhesion determined according to the invention corresponds to the lateral guiding force at the tires of the motorcycle.

Another embodiment according to the invention for determining the coefficient of adhesion provides for retarding the rear wheel somewhat more than the front wheel. In contrast to four-wheel vehicles this is much less critical with two-wheel vehicles. In accordance with the invention, according to FIG. 3, the coefficient of brake pressure μ (coefficient of adhesion) of the rear wheel is increased by a certain relatively small amount ◊ $μ_L$ as compared to the coefficient of brake pressure prevailing at the front wheel. That is demonstrated in FIG. 3a in the usual presentation of a coefficient of brake pressure/slip curve. The slip S is entered on the abscissa.

In FIG. 3a–d the coefficients of brake pressure of the front wheel each are illustrated by an empty circle and those of the rear wheel by a solid circle.

Figure 3A:
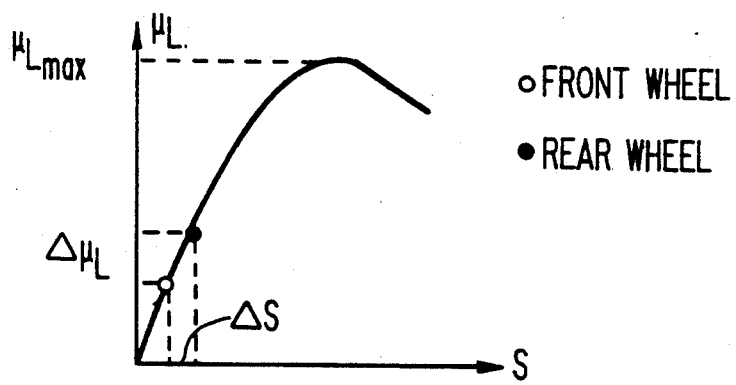
FIGS. 3a-3d are diagrammatic presentations of the longitudinal and lateral coefficients of adhesion, respectively, as a function of slip.

If the coefficient of brake pressure $μ_L$ of the rear wheel is raised by the value ◊ $μ_L$ the slip with respect to the front wheel changes by the amount ◊ S (FIG. 3a).

Figure 3B:
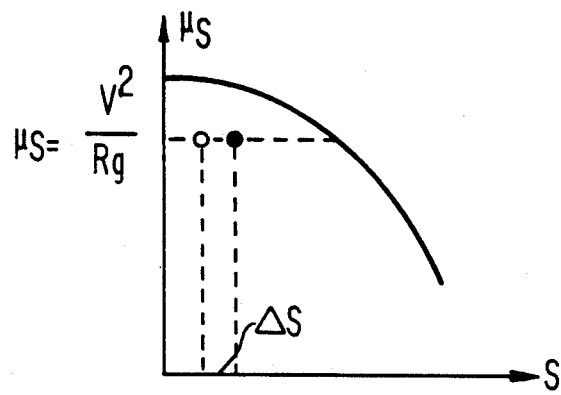

FIG. 3b shows the lateral coefficient of brake pressure under the same circumstances as in FIG. 3a. The lateral coefficient of brake pressure (also called coefficient of lateral force) diminishes at increasing slip, as is known and illustrated in FIG. 3b by the continuous line (cf. e.g. the above mentioned BOSCH TECHNISCHE BERICHTE or the paper by H. Laiber and W.D. Limpert in AUTOMOBILTECHNISCHE ZEITSCHRIFT, Juni 1969, page 181 et seqq.).

In FIGS. 3a and 3b the relative augmentation of the brake pressure at the rear wheel as compared to the brake pressure at the front wheel begins relatively soon, i.e. far within the stable range of the coefficient of brake pressure/slip curve, i.e. far to the left of maximum $μ_{Lmax}$. For this reason the coefficients of lateral force $μ_S$ of the front and rear wheels remain the same according to FIG. 3b since the system is clearly within the so-called Kummer's circle (cf. e.g. the journal quoted above: AUTOMOBILTECHNISCHE ZEITSCHRIFT, FIG. 2). In FIG. 3b the formula $μ_S = v/R \times g$ means the conversion of the formula for the centrifugal force according to the coefficient of lateral adhesion, with v being the vehicle speed, R the radius of the curve, and g the acceleration due to gravity.

Figure 3C:
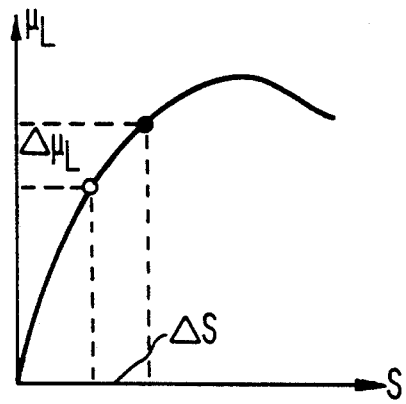
Figure 3D:
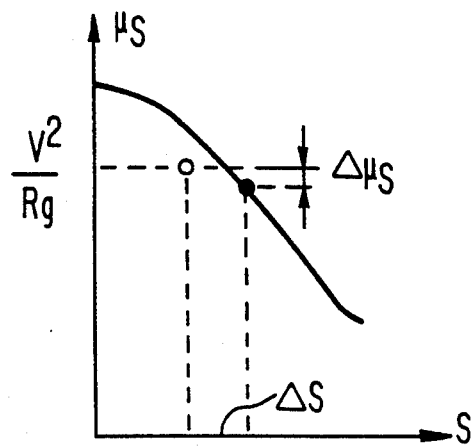

The conditions are different in FIGS. 3c and 3d. There the pressure increase in the brake of the rear wheel begins much closer to the maximum of the coefficient of brake pressure/slip curve (FIG. 3c) so that the lateral guiding force of the rear wheel drops according to FIG. 3d. The systems reaches the limits, predetermined by Kummer's circle mentioned above, as regards the longitudinal coefficient of brake pressure $\mu_L$ and the lateral coefficient of brake pressure $\mu_S$ (lateral guiding force). According to FIG. 3d, therefore, in this case also a difference $\Delta \mu_S$ occurs between the front and rear wheels. This difference $\Delta \mu_S$ can be determined based on the measurement described above of $\mu_S$. It indicates that the rear wheel should not be subjected any longer to higher pressurization but that instead its pressure should be lowered again together with the brake pressure of the front wheel until the difference $\Delta \mu_S$ disappears and the system once more complies with the conditions according to FIGS. 3a and 3b.

The interplay described above of increasing the brake pressure at the rear wheel as compared to the brake pressure at the front wheel to produce the difference $\Delta \mu_L$ and the associated observation of the difference $\Delta \mu_S$ permits new ABS braking of motorcycles. The brake pressure at the rear wheel is raised by a predetermined amount as compared to the brake pressure at the front wheel so that the coefficient of adhesion of the rear wheel in each instance is greater by the difference $\Delta \mu_L$ than that of the front wheel. Stable conditions of the wheels are assumed, i.e. the system is to the left of the maximum of the coefficient of friction/slip curve (FIGS. 3a, c). This raising is continued for as long as the lateral coefficient of adhesion $\mu_S$ of the rear wheel equals the lateral coefficient of adhesion $\Delta \mu_S$ of the front wheel (FIG. 3b). If, on the other hand, a difference occurs between the lateral coefficients of adhesion $\mu_S$ of the front and rear wheels that is an indication of the fact that the brake pressure has reached a maximum value and that consequently the brake pressures in the brakes of the front and rear wheels must be lowered at the same time until the difference in respect of the lateral coefficients of adhesion $\Delta \mu_S$ disappears. It is understood that the value $\Delta \mu_L$ is not increased beyond the maximum value $\mu_{Lmax}$ (FIG. 3a).

What is claimed is:

1. A method of anti-lock braking of a motorcycle having front and rear wheels each having a brakes, comprising the steps of:
   a) applying braking pressure to said front and rear wheel brakes,
   b) measuring the value of rotational retardation and slip of the front wheel and the rear wheel of the motorcycle,
   c) comparing the value of the measured rotational retardation and slip of the front and rear wheels with a predetermined threshold value,
   d) maintaining or reducing said braking pressure when said measured value exceeds a predetermined threshold value,
   e) applying for a predetermined period of time to the brake of the rear wheel a higher brake pressure than to the brake of the front wheel,
   f) comparing, at the time when a higher brake pressure is applied to the brake of the rear wheel than to the brake of the front wheel, rotational speeds and rotational retardations of the front and the rear wheels, and
   g) adjusting said threshold value in response to said comparison.

2. A method of determining a coefficient of adhesion between a roadway and wheels of a motorcycle, the motorcycle having a front and a rear wheel each wheel having a brake, comprising the steps of:
   a) applying to the brake of the rear wheel of the motorcycle a brake pressure such that the rear wheel is retarded more than the front wheel for a predetermined period of time,
   b) comparing, at the time when the rear wheel is retarded more than the front wheel, rotational speeds of the front and the rear wheels, and
   c) deriving said coefficient of adhesion from the result of said comparison.

3. A method of anti-lock braking of a motorcycle having front and rear wheels each provided with brakes, comprising the steps of:
   a) measuring a value of rotational retardation and slip of the front wheel and the rear wheel of the motorcycle,
   b) comparing the measured value of rotational retardation and slip of the front and rear wheels with a threshold value in order to derive control signals for said anti-lock braking,
   c) applying to the brakes of the rear wheel of the motorcycle a brake pressure such that the rear wheel is retarded more than the front wheel for a predetermined period of time,
   d) comparing, at the time when the rear wheel is retarded more than the front wheel rotational speeds of the front and the rear wheels,
   e) deriving a coefficient of adhesion from the result of said comparison, and
   f) adjusting said threshold value in accordance with said derived coefficient of adhesion.

4. The method as claimed in any one of the preceding claims, characterized in that, in addition a slope of the motorcycle relative to a surface on which it is traveling is measured.

* * * * *